Jan. 17, 1933. A. W. HOBSON 1,894,490
PNEUMATIC TIRE PRESSURE GAUGE
Filed Oct. 11, 1929
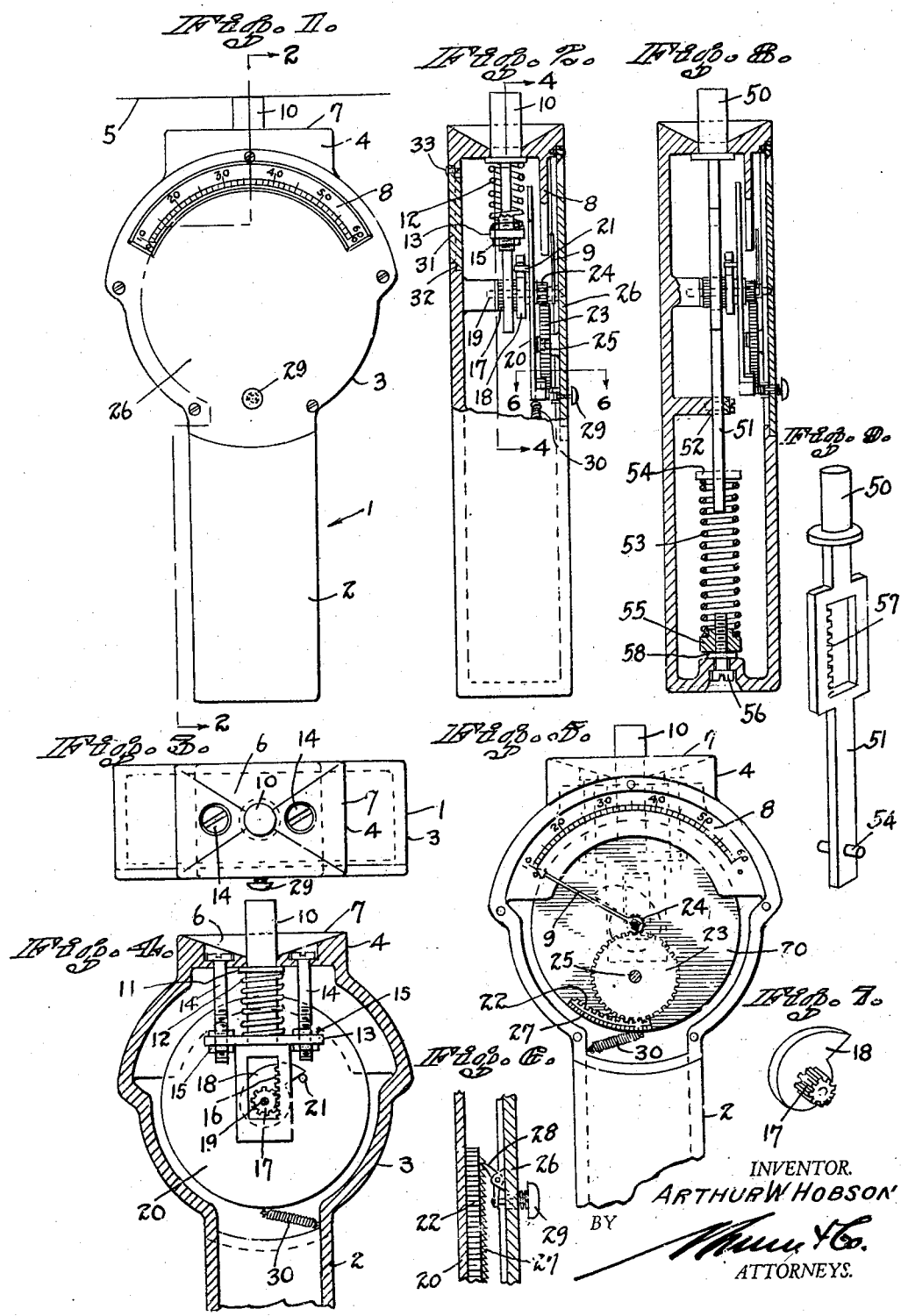
INVENTOR.
ARTHUR W HOBSON
BY
ATTORNEYS.

Patented Jan. 17, 1933

1,894,490

UNITED STATES PATENT OFFICE

ARTHUR W. HOBSON, OF SAN FRANCISCO, CALIFORNIA

PNEUMATIC TIRE PRESSURE GAUGE

Application filed October 11, 1929. Serial No. 398,980.

My invention relates to improvement in a pneumatic tire pressure gauge and it consists in the combinations, constructions, and arrangements hereinafter described and claimed.

An object of my invention is to provide a tire pressure gauge that is designed to be applied to the exterior surface of the tire and to indicate the air pressure within the tire. This device does not have to be applied to the valve stem, as is usually the case with standard tire pressure gauges.

A further object of my invention is to provide a device of the type described that makes use of a spring that will be uniformly compressed in a direct ratio to the number of pounds of force directed against the indicating mechanism. This permits a scale to be used that has equal graduations. A pointer moves over the scale and indicates the air pressure within the tire.

The device further makes use of novel means for changing a relatively small movement into a much longer movement so that the reading of the tire air pressure is made easy.

Still a further advantage is obtained from the mechanism which holds the indicator after it has been moved into its furthest position, yet permits the actuating plunger to return to normal position. The indicator returns to normal position upon the pressing of a release button.

The gauge has a rectangularly shaped end that is designed to be placed against the surface of the tire. This end is hollowed out and the spring pressed plunger is centrally disposed in the hollowed out portion and normally projects beyond the rectangularly shaped edge. This particular construction permits a freer flexing of the tire casing, and also causes the gauge to engage with the tire casing at a fixed distance from the actuating pin or plunger. The device is simple in construction and is durable and efficient for the purpose intended.

Other objects and advantages will appear in the following specification, and the novel features of my invention will be particularly pointed out in what I hereinafter claim.

My invention is illustrated in the accompanying drawing forming a part of this application, in which Figure 1 is a front elevation of the device.

Figure 2 is a section along the line 2—2 of Figure 1.

Figure 3 is a top plan view of the device.

Figure 4 is a section along the line 4—4 of Figure 2.

Figure 5 is similar to Figure 1, but shows the cover plate removed.

Figure 6 is a section along the line 6—6 of Figure 2.

Figure 7 is a perspective view of a part of the device.

Figure 8 is a longitudinal section of a modified form of the device, and

Figure 9 is a perspective view of a part of the device shown in Figure 8.

In carrying out my invention I provide a casing indicated generally at 1. This casing has a hand grip portion 2, an enlarged portion 3, (see Figure 4), for receiving the actuating mechanism, and a head portion 4 that is designed to be brought into contact with the exterior surface of a tire casing 5, (see Figure 1). Figures 3 and 4 clearly show the head portion 4 as being rectangular in shape and as having a recessed or hollowed out part 6, thereby defining a rectangularly shaped edge 7. It is this edge 7 which always contacts with the tire 5. The portion of the tire casing enclosed by the rectangular edge 7 can flex in direct ratio with the amount of air pressure contained within the tire. The amount of flexing of the tire casing is recorded on a dial 8, (see Figures 1 and 5), and the mechanism connecting a pointer 9, movable over the dial, with the tire casing, will now be described. A spring pressed pin or plunger 10, (see Figure 4), is centrally disposed in the head portion 4 and normally projects beyond the edge 7. The pin 10 enters the casing 1 and has a shoulder 11 that limits the downward movements of the pin. A spring 12 bears against the shoulder of the annular flange 11, and also bears against a guide member 13. A movement of the pin 10 inwardly will compress the spring 12. The spring is designed to be uniformly compressed in direct ratio to the increase of the force exerted against the pin.

A guide member 13 is carried by screws 14 and is adjustably locked in place by nuts 15. The pressure of the spring 12 is varied by means of this adjustment.

The pin 10 carries a rack 16 and this rack meshes with a pinion 17 that is formed integrally with a finger 18, (see Figure 7). The pinion 17 and the finger 18 are rotated in a clockwise direction when the pin or plunger 10 is moved downwardly. Reference to Figure 2 shows the pinion 17 and the finger 18 as being loosely mounted upon a shaft 19. A disk 20 is also loosely mounted upon the same shaft and carries a pin 21 that is engaged by the finger 18. Figure 5 shows how the disk carries a rack sector 22 at its periphery. This rack meshes with a gear 23 and the gear is in mesh with a pinion 24. The gear 23 is carried by a stub shaft 25, that in turn is supported by a cover member 26, while the pinion 24 is mounted on the shaft 19. The cover 26 has a window through which the dial 8 may be viewed.

It will be seen from the construction thus far that a movement of the plunger 10 inwardly will swing the pointer 9 over the dial 8 because the pointer is rigidly connected to the pinion 24. The gear ratio moves the pointer 9 a considerable distance for a slight movement of the plunger 10. It will also be seen that the dial 8 has equal graduation marked thereon.

I provide means for holding the pointer in the position into which it has been swung by the movement of the plunger 10. This means is shown in Figures 5 and 6. The sector 22 has a flange 27 with teeth formed therein and a pawl 28 rides over the teeth. Figure 6 is a section taken above and looking down upon the sector 22 and ratchet teeth 27 so that a counterclockwise movement of the disk 20 in Figure 5 will be an upward movement in Figure 6. This pawl permits movement of the disk 20 in a counterclockwise direction, when looking at Figure 5, but prevents a return movement. Figure 6 shows the pawl 28 as being connected to a spring pressed push button 29. A depressing of the push button 29 frees the pawl from the teeth and permits a spring 30, (see Figures 4 and 5), to return the disk to initial position. It should be noted that the pawl 28 merely holds the disk 20 against return movement. The plunger 10 is free to return because the finger 18 will move away from the pin 21 during the return movement of the plunger. When the disk 20 is released, the spring 30 will rotate it until the pin 21 again strikes the finger 18.

Access may be had to the interior of the device by means of a back cover 31, (see Figure 2). This cover has a flange 32 at its lower edge and the top of the cover is held in place by a screw 33, or other suitable fastening means.

From the foregoing description of the various parts of the device, the operation thereof may be readily understood.

In using the device the handle 2 is grasped and the plunger 10 is forced against the tire casing 5 until the edge 7 contacts with the tire casing. The pressure of air within the tire will cause the plunger 10 to be moved inwardly in direct ratio to the amount of pressure. This movement is transmitted to the pointer 9 in the manner already described. The pointer is held in its new position by a pawl 28, and is only released when the push button 29 is depressed.

In Figures 8 and 9 I show a modified form of the device. This form is identical to that already described except that it is used for high pressure and it has a plunger 50 which takes the place of the plunger 10. This plunger is similar to the plunger 10, but has in addition a depending member 51 that slides in a guide 52. The guide 52 takes the place of the guide 13. A spring 53, having a uniform compression, bears against a pin 54, carried by the portion 51 and has its lower end disposed on an adjustable nut 55. The nut 55 is moved by means of a bolt 56 that is carried by the casing 1.

The spring 53 returns the plunger 50 in the same manner as the spring 12 returns the plunger 10. The plunger 50 carries the rack 57, which is similar to the rack 16. The rack 54 meshes with the operating parts and actuates them in the manner already described. Like reference numerals will therefore be applied.

Although I have shown and described two embodiments of my invention, it is to be understood that the same is susceptible of various changes and I reserve the right to employ such changes as may come within the scope of the invention as claimed.

It should be particularly noted that when the device is forced against the exterior surface of a tire and is moved so as to bring the edge 7 into a firm contact with the tire, the pointer 9 will register the exact air pressure in the tire at this moment and will register no more than the exact air pressure.

I claim:

1. A tire pressure gauge comprising a casing having a recessed portion, the marginal edge of the recess being designed to press against the exterior surface of a tire, a plunger carried by the casing and being centrally disposed in said recess, said plunger adapted to be moved by the reaction pressure of the tire casing, and air pressure indicating means operatively connected to said plunger.

2. A tire pressure gauge comprising a casing having a cup-shaped end defining an edge adapted to be brought into contact with the tire, a plunger mounted in said casing and extending through the cup-shaped portion, a pointer operatively connected to the plunger and a dial having equal graduations over which the pointer is adapted to move.

3. A tire pressure indicator comprising a casing, a plunger slidably carried thereby and extending therefrom, said plunger being designed to be moved against a tire, spring means for moving said plunger into extended position when the indicator is removed from the tire, a rack forming a part of the plunger, a pinion rotated by said rack and having an integral finger, a rotatable disc having a pin engageable by the finger when the latter is moved in one direction so as to rotate the disc, a pointer operatively connected to said disc and being movable thereby, said casing having a dial over which the pointer moves, means for holding said disc in the maximum position into which it is moved, said last-named means being manually releasable, and spring means for returning the disc and pointer to normal when released.

4. A tire pressure gauge comprising a casing having a hand-gripping portion designed to be held against the body of the user, a pointer carried by said casing, a spring-pressed plunger carried by said casing and being movable against a tire, said plunger being operatively connected to the pointer, said casing having the portion disposed adjacent to the plunger provided with a recess for forming an edge that is movable against the tire, said edge when contacting with the tire causing the portion of the tire enclosed by the edge to be flexed by the plunger in direct proportion to the air pressure in the tire, the plunger moving the pointer for indicating the air pressure within the tire.

ARTHUR W. HOBSON.